(12) United States Patent
Aoyama

(10) Patent No.: US 11,949,993 B2
(45) Date of Patent: Apr. 2, 2024

(54) ELECTRIC DEVICE, CONTROLLING METHOD OF CONTROLLING ELECTRIC DEVICE, AND COMPUTER READABLE STORAGE MEDIUM

(71) Applicant: GUANGDONG OPPO MOBILE TELECOMMUNICATIONS CORP., LTD., Dongguan (CN)

(72) Inventor: Chiaki Aoyama, Yokohama (JP)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/088,688

(22) Filed: Dec. 26, 2022

(65) Prior Publication Data
US 2023/0138289 A1    May 4, 2023

Related U.S. Application Data

(63) Continuation of application No. PCT/CN2020/116144, filed on Sep. 18, 2020.

(51) Int. Cl.
*H04N 23/698* (2023.01)
*H04N 23/611* (2023.01)
*H04N 23/63* (2023.01)

(52) U.S. Cl.
CPC ......... *H04N 23/698* (2023.01); *H04N 23/611* (2023.01); *H04N 23/634* (2023.01)

(58) Field of Classification Search
CPC .. H04N 23/698; H04N 23/611; H04N 23/634; H04N 23/635; H04N 23/6812; H04N 23/687; H04N 23/64
See application file for complete search history.

(56) References Cited

U.S. PATENT DOCUMENTS

| | | | |
|---|---|---|---|
| 2015/0201124 A1 | 7/2015 | Litvak et al. | |
| 2019/0260947 A1* | 8/2019 | Imazu | H04N 23/69 |

FOREIGN PATENT DOCUMENTS

| | | |
|---|---|---|
| CN | 103607542 A | 2/2014 |
| CN | 110995982 A | 4/2020 |
| JP | 5257157 B2 | 8/2013 |
| JP | 5370577 B2 | 12/2013 |
| JP | 5379334 B1 | 12/2013 |
| JP | 6178048 B2 | 8/2017 |
| JP | 6408019 B2 | 10/2018 |

OTHER PUBLICATIONS

International Search Report and Written Opinion dated Apr. 26, 2021 in International Application No. PCT/CN2020/116144.

* cited by examiner

*Primary Examiner* — Yogesh K Aggarwal

(74) *Attorney, Agent, or Firm* — Sheppard, Mullin, Richter, & Hapinton, LLP

(57) ABSTRACT

An electric device according to the embodiments of the present disclosure includes a camera module that takes a photograph of a subject to acquire a first camera image, and takes a photograph of the subject to acquire a second camera image with a wider angle of view than the first camera image; an image signal processor that controls the camera module to acquire a camera image; and a display module that displays an image.

16 Claims, 17 Drawing Sheets

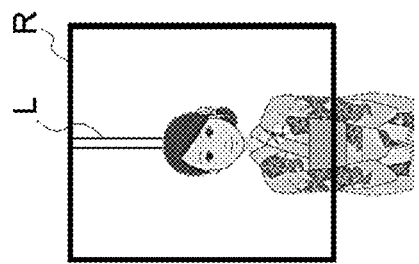
FIG.16A
FIG.16B
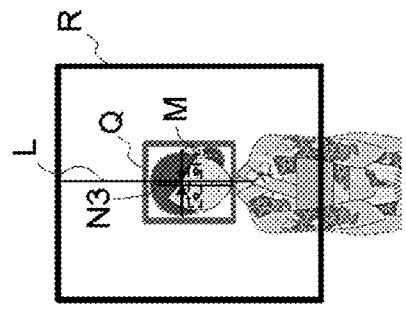
FIG.16C
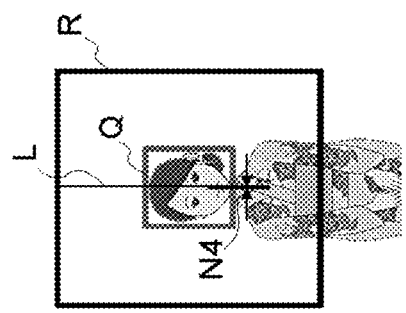
FIG.16D

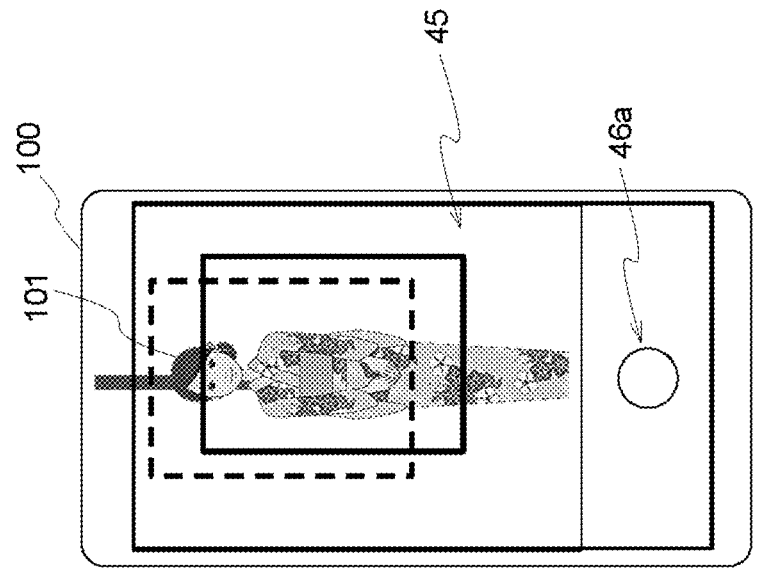
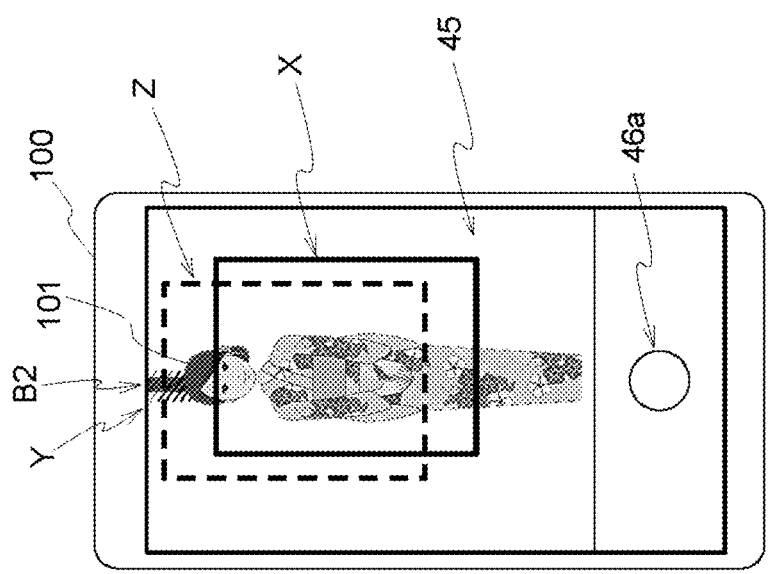

ELECTRIC DEVICE, CONTROLLING METHOD OF CONTROLLING ELECTRIC DEVICE, AND COMPUTER READABLE STORAGE MEDIUM

CROSS-REFERENCE TO RELATED APPLICATION

The present application is a continuation of and claims priority to International Patent Application No. PCT/CN2020/116144, filed Sep. 18, 2020 and titled "ELECTRIC DEVICE, CONTROLLING METHOD OF CONTROLLING ELECTRIC DEVICE, AND COMPUTER READABLE STORAGE MEDIUM," which is incorporated herein by reference in its entirety.

TECHNICAL FIELD

The present invention relates to an electric device, a controlling method of controlling the electric device, and a computer readable storage medium.

BACKGROUND

Conventionally, the user shoots with a digital camera, depending on the sense and the grid displayed on the screen when shooting. Furthermore, the user may trim an extra portion of the captured image with the digital camera. Furthermore, the photographed image may become an inappropriate image due to the straight lines appearing around the face.

In particular, when the user is a beginner, the user is likely to shoot an unbalanced composition with the digital camera. Furthermore, the beginner is not likely to notice an inappropriate background when a portrait is taken with a digital camera. Furthermore, it is difficult for the beginner to determine the composition by considering the outside of the shooting range.

As described above, if the user is a beginner, it is required that the user be able to easily take an image with an appropriate composition so that an inappropriate background does not appear when the user takes an image with a camera of an electronic device such as a smartphone.

SUMMARY

Therefore, in the electronic device of the present invention, a subject (for example, a person) is photographed by the super wide camera module with a wider angle of view than this wide camera module, and the composition of the planned capturing area for shooting the subject with the wide camera module is determined. Furthermore, in the electronic device, the frame of the composition automatically selected is displayed on the display module. Furthermore, in the electronic device, the display module gives a warning display to an inappropriate background portion in the composition. Then, in the electronic device, the subject is photographed by the wide camera module with the determined composition.

In this way, the electric device of the present invention can easily obtain a camera image with an appropriate composition and without improper backgrounds when photographing with a camera of an electronic device such as a smartphone.

The present disclosure aims to solve at least one of the technical problems mentioned above. Accordingly, the present disclosure needs to provide an electric device and a controlling method of controlling electric device.

In accordance with the present disclosure, an electric device may include: a camera module that takes a photograph of a subject to acquire a first camera image, and takes a photograph of the subject to acquire a second camera image with a wider angle of view than the first camera image; an image signal processor that controls the camera module to acquire a camera image; and a display module that displays an image, wherein the image signal processor acquires the second camera image of the subject by controlling the camera module, then, the image signal processor sets a planned capturing area in the second camera image corresponding to the area of the first camera image planned to be captured by the camera module, then, the image signal processor sets a recommended frame of a recommended composition based on an image of the subject and the planned capturing area in the second camera image, then, the display module displays the planned capturing area and the recommended frame in the second camera image, and then, the image signal processor acquires the first camera image by capturing the subject with a final composition of the planned capturing area by controlling the camera module.

In some embodiments, the first camera image is a wide camera image, and the second camera image is a super wide camera image.

In some embodiments, the display module displays a warning when an unsuitable image is included around the subject in the super wide camera image, based on the image of the subject and the background image of the subject in the super wide camera image, after the display module displays the planned capturing area and the recommended frame in the super wide camera image.

In some embodiments, the camera module includes: a wide camera module that captures the wide camera image by imaging the subject, and a super wide camera module that captures the super wide camera image by imaging the subject at a wider angle of view than the wide camera module.

In some embodiments, the image signal processor acquires the super wide camera image of the subject by controlling the super wide camera module, the image signal processor sets the planned capturing area in the super wide camera image corresponding to the area of the wide camera image planned to be captured by the wide camera module, the image signal processor sets the recommended frame of a recommended composition for capturing with the wide camera module, based on the image of the subject and the planned capturing area in the super wide camera image, the display module displays the planned capturing area and the recommended frame, the display module displays a warning when the unsuitable image is included around the subject in the super wide camera image, based on the image of the subject and the background image of the subject in the super wide camera image, and the image signal processor acquires the wide camera image by capturing the subject with the final composition of the planned capturing area by controlling the wide camera module.

In some embodiments, the image signal processor determines a final composition of the planned capturing area where the wide camera module captures the subject, in response to a user's operation input that causes the planned capturing area to approach the recommended frame.

In some embodiments, the image signal processor controls the wide camera module to capture the wide camera image by capturing an image of the subject with a final composition of the planned capturing area, in response to user's operation input.

In some embodiments, the image signal processor sets the recommended frame of a recommended composition for capturing with the wide camera module, based on the position and size of the face image of the person of the subject in the planned capturing area.

In some embodiments, the image signal processor sets the recommended frame of a recommended composition for capturing with the wide camera module. based on an eye position of the face image of the subject in the planned capturing area.

In some embodiments, the image signal processor displays the warning on the display module, when the image signal processor determines that a pre-specified inappropriate image is included around the face image of the subject, based on the face image of the subject and the background image of the subject in the super wide camera image.

In some embodiments, when the subject is a plurality of people, the image signal processor sets the recommended frame so as to include the face images of the plurality of people in the super wide camera image.

In some embodiments, in the super wide camera image, a shape and size of the range of the planned capturing area and a shape and size of the range of the recommended frame are the same.

In some embodiments, the display module displays the wide camera image acquired by capturing the subject with the composition of the final planned capturing area.

In some embodiments, the electric device further comprises: an input module which receives the operation of the user; and a main processor that controls the display module and the input module.

In accordance with the present disclosure, a controlling method for controlling an electric device including: a camera module that takes a photograph of a subject to acquire a first camera image, and takes a photograph of the subject to acquire a second camera image with a wider angle of view than the first camera image; an image signal processor that controls the camera module to acquire a camera image; and a display module that displays an image, the controlling method comprising: acquiring, by means of the image signal processor, the second camera image of the subject, by controlling the camera module, setting, by means of the image signal processor, a planned capturing area in the second camera image corresponding to an area of the first camera image planned to be captured by the camera module, setting, by means of the image signal processor, a recommended frame of a recommended composition based on an image of the subject and the planned capturing area in the second camera image, displaying, by means of the display module, the planned capturing area and the recommended frame in the second camera image, displaying, by means of the display module, a warning when an unsuitable image is included around the subject in the second camera image, based on the image of the subject and the background image of the subject in the second camera image, and acquiring, by means of the image signal processor, the first camera image by capturing the subject with a final composition of the planned capturing area by controlling the camera module.

In accordance with the present disclosure, a computer readable storage medium having a computer program stored thereon, wherein when the computer program is executed by a processor, the computer program implements a controlling method for controlling an electric device comprising: a camera module that takes a photograph of a subject to acquire a first camera image, and takes a photograph of the subject to acquire a second camera image with a wider angle of view than the first camera image; an image signal processor that controls the camera module to acquire a camera image; and a display module that displays an image, and the controlling method comprises: acquiring, by means of the image signal processor, the second camera image of the subject, by controlling the camera module, setting, by means of the image signal processor, a planned capturing area in the second camera image corresponding to an area of the first camera image planned to be captured by the camera module, setting, by means of the image signal processor, a recommended frame of a recommended composition based on an image of the subject and the planned capturing area in the second camera image, displaying, by means of the display module, the planned capturing area and the recommended frame in the second camera image, and acquiring, by means of the image signal processor, the first camera image by capturing the subject with a final composition of the planned capturing area by controlling the camera module.

BRIEF DESCRIPTION OF THE DRAWINGS

These and/or other aspects and advantages of embodiments of the present disclosure will become apparent and more readily appreciated from the following descriptions made with reference to the drawings, in which:

FIG. 16A is a diagram showing an example in which an inappropriate background (a vertical bar) is located near the face image of the subject;

FIG. 16B is a diagram showing an example of an image of the processing in step S401 shown in FIG. 13 for the image shown in FIG. 16A;

FIG. 16C is a diagram showing an example of an image of the process in step S402 shown in FIG. 13, subsequent to FIG. 16B;

FIG. 16D is a diagram illustrating an example of an image of the process in step S403 shown in FIG. 13, subsequent to FIG. 16C;

FIG. 17A is a diagram showing an example of the display of the display module 45 of the electronic device 100 when the warning in step S404 shown in FIG. 13 is turned on for the image shown in FIG. 16A; and FIG. 17B is a diagram showing an example of the display of the display module 45 of the electronic device 100 when the warning in step S404 shown in FIG. 13 is turned off for the image shown in FIG. 16A.

DETAILED DESCRIPTION

Figure 1:
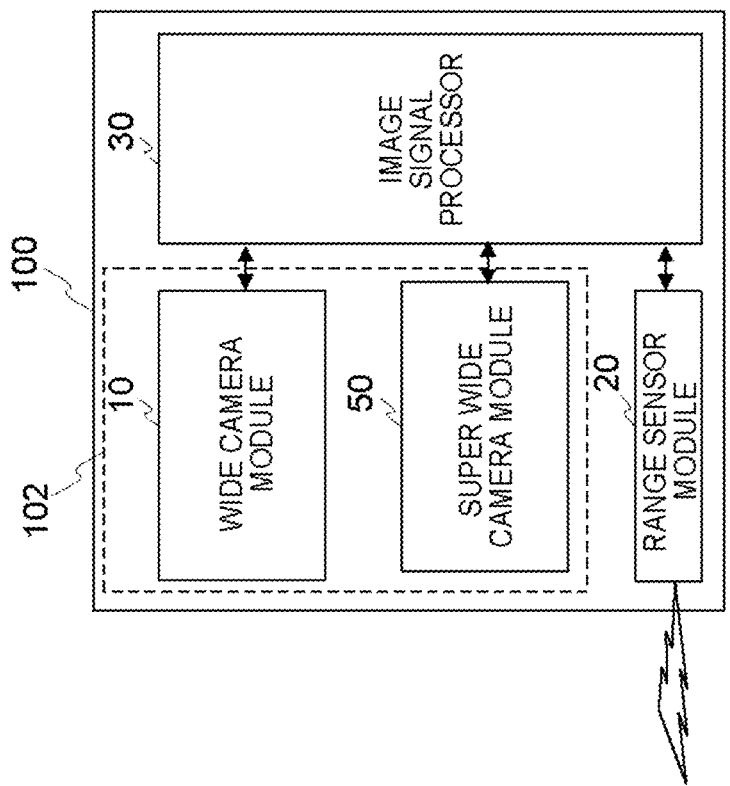
FIG. 1 is a diagram illustrating an example of an arrangement of an electric device 100 and a subject 101 according to an embodiment of the present invention.
Figure 1:
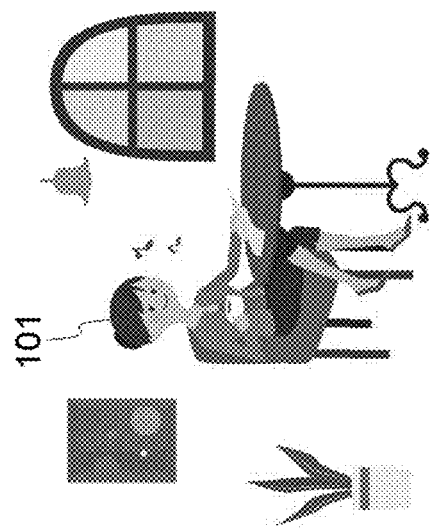

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

Figure 2:
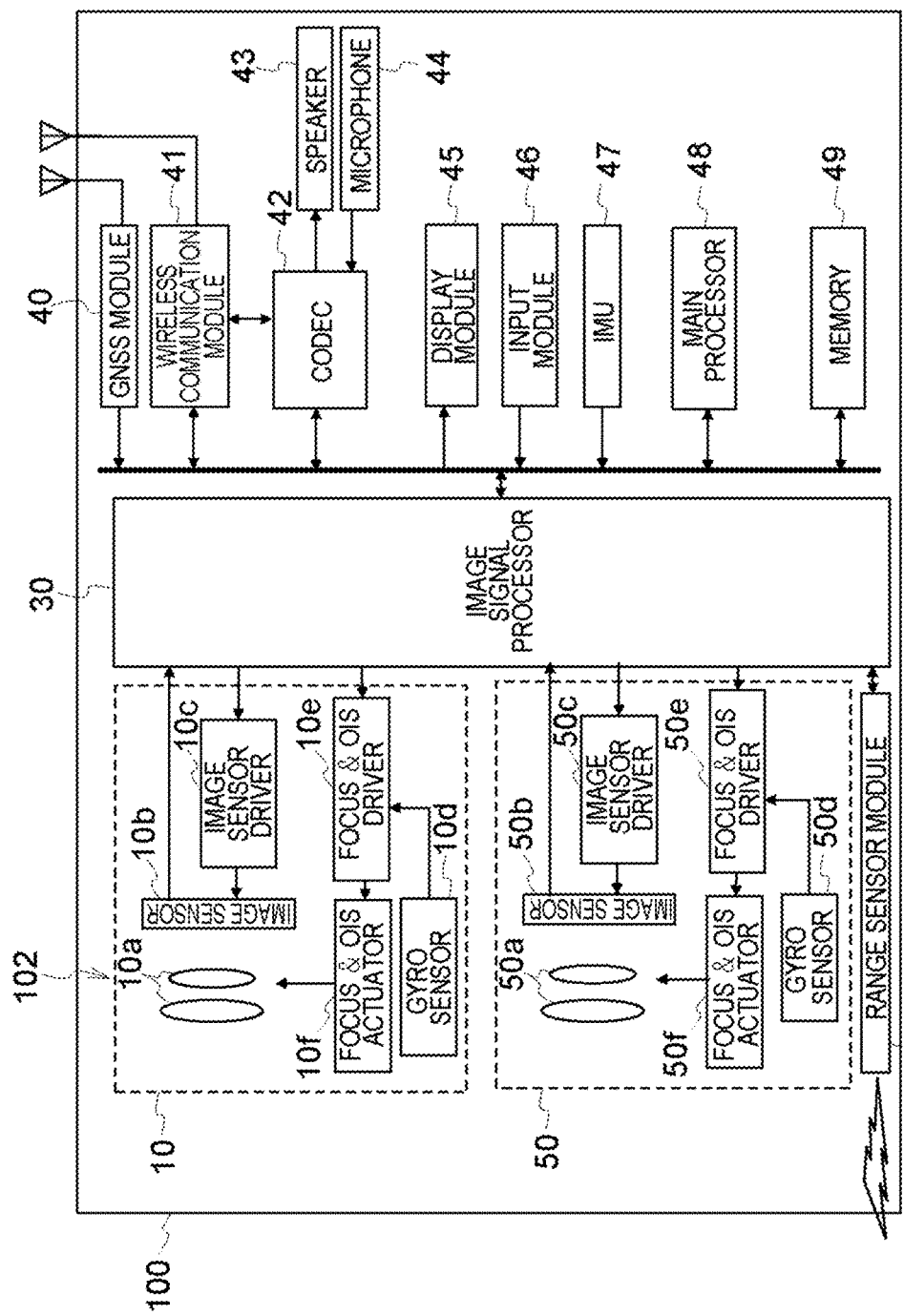
FIG. 2 is a diagram illustrating an example of the configuration of the electric device 100 shown in FIG. 1.

FIG. 1 is a diagram illustrating an example of an arrangement of an electric device 100 and a subject 101 according to an embodiment of the present invention. FIG. 2 is a diagram illustrating an example of the configuration of the electric device 100 shown in FIG. 1.

As shown in FIG. 1 and FIG. 2, for example, the electric device 100 includes a wide camera module 10 (a first camera module), a super wide camera module (a second camera module) 50, a range sensor module 20, and an image signal processor 30 that controls the camera module 10, the super wide camera module 50, and the range sensor module 20, and processes camera image data acquired from the wide camera module 10 and the super wide camera module 50. Note that, as shown in FIGS. 1 and 2, the wide camera module 10 and the super wide camera module 50 form a camera module 102. That is, the camera module 102 images a subject to acquire a wide camera image, and also captures the subject at a wider angle of view than the wide camera image to acquire a super wide camera image.

The wide camera module 10 includes, for example, a master lens 10a that is capable of focusing on a subject, a master image sensor 10b that detects an image inputted via the master lens 10a, and a master image sensor driver 10c that drives the master image sensor 10b, as shown in FIG. 2.

Furthermore, the wide camera module 10 includes, for example, a Gyro sensor 10d that the angular velocity and the acceleration of the wide camera module 10, a focus & OIS actuator 10f that actuates the master lens 10a, and a focus & OIS driver 10e that drives the focus & OIS actuator 10f, as shown in FIG. 2.

For example, the wide camera module 10 acquires a wide camera image (a first camera image) of the subjects 101. The super wide camera module 50 includes, for example, a slave lens 50a that is capable of focusing on a subject, a slave image sensor 50b that detects an image inputted via the slave lens 50a, and a slave image sensor driver 50c that drives the slave image sensor 50b, as shown in FIG. 2.

Furthermore, the super wide camera module 50 includes, for example, a Gyro sensor 50d that the angular velocity and the acceleration of the super wide camera module 50, a focus & OIS actuator 50f that actuates the slave lens 50a, and a focus & OIS driver 50e that drives the focus & OIS actuator 50f, as shown in FIG. 2.

The super wide camera module 50 acquires a super wide camera image (a second camera image) of the subjects 101 with a wider angle of view than that of the wide camera module 10.

The range sensor module 20 acquires range depth information of the subject 101 by using a light. Especially, the range sensor module 20 acquires the time of flight (ToF) depth information (ToF depth value) as the range depth information by emitting pulsed light toward the subjects 101, and detecting the reflection light from the subjects 101, for example. The image signal processor 30 controls, for example, the camera module 102 (the wide camera module 10 and the super wide camera module 50) and the range sensor module 20 to acquire a camera image based on the camera image obtained by means of the wide camera module 10, the super wide camera image obtained by means of the super wide camera module 50, and the ToF depth information (the range depth information) obtained by means of the range sensor module 20. Furthermore, as shown in FIG. 2, for example, the electric device 100 includes a global navigation satellite system (GNSS) module 40, a wireless communication module 41, a CODEC 42, a speaker 43, a microphone 44, a display module 45, an input module 46, an inertial measuring unit (IMU) 47, a main processor 48, and a memory 49.

The GNSS module 40 measures the current position of the electric device 100, for example.

The wireless communication module 41 performs wireless communications with the Internet, for example.

The CODEC 42 bidirectionally performs encoding and decoding, using a predetermined encoding/decoding method, as shown in FIG. 2 for example.

The speaker 43 outputs a sound in accordance with sound data decoded by the CODEC 42, for example.

The microphone 44 outputs sound data to the CODEC 42 based on inputted sound, for example.

The display module 45 displays predefined information. The display module 45 is, for example, a touch panel.

The input module 46 receives a user's input (a user's operations). The input module 46 is included in, for example, the touch panel.

The IMU 47 detects, for example, the angular velocity and the acceleration of the electric device 100.

The main processor 48 controls the global navigation satellite system (GNSS) module 40, the wireless communication module 41, the CODEC 42, the speaker 43, the microphone 44, the display module 45, the input module 46, and the IMU 47.

The memory 49 stores a program and data required for the image signal processor 30 to control the wide camera module 10, the super wide camera module 50 and the range sensor module 20, acquired image data, and a program and data required for the main processor 48 to control the electric device 100.

For example, the memory 49 includes a computer readable storage medium having a computer program stored thereon, wherein when the computer program is executed by the main processor 48, the computer program implements a controlling method for controlling the electric device 100. For example, the controlling method comprises: acquiring, by means of the image signal processor 30, the super wide camera image of the subject, by controlling the camera module 102,
  setting, by means of the image signal processor 30, a planned capturing area in the super wide camera image corresponding to an area of the wide camera image planned to be captured by the camera module 102,
  setting, by means of the image signal processor 30, a recommended frame of a recommended composition based on an image of the subject and the planned capturing area in the super wide camera image,
  displaying, by means of the display module, the planned capturing area and the recommended frame in the super wide camera image,
  displaying, by means of the display module 45, a warning when an unsuitable image is included around the subject in the super wide camera image, based on the image of the subject and the background image of the subject in the super wide camera image, and
  acquiring, by means of the image signal processor, the wide camera image by capturing the subject with a final composition of the planned capturing area by controlling the camera module 102.

The electric device 100 having the above-described configuration is a mobile phone such as a smartphone in this embodiment, but may be other types of electric devices (for instance, a tablet computer and a PDA) including the wide camera module 10 and the super wide camera module 50.

Figure 3:
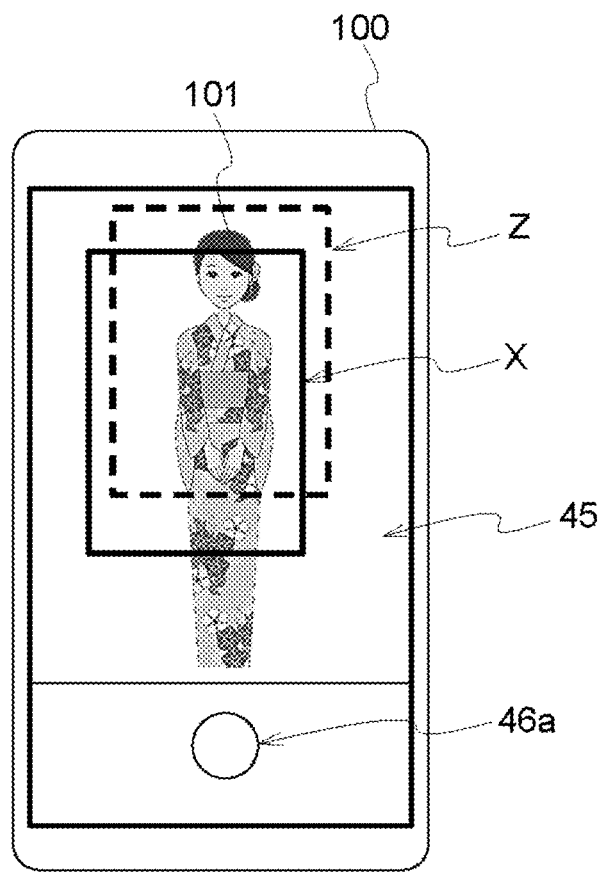
FIG. 3 is a diagram showing an example of a display of the display module of the electric device shown in FIG. 2 when a subject is photographed.

Here, an example of the display of the display module 45 of the electronic device 100, when the subject 101 is photographed, will be described. FIG. 3 is a diagram showing an example of a display of the display module of the electric device shown in FIG. 2 when a subject is photographed.

As shown in FIG. 3, when the subject 101 is photographed, the image planned capturing area X corresponding to an area of the wide camera image to be captured by the camera module 102 and the recommended frame Z of the recommended composition for photographing with the camera module 102 are displayed as the super wide camera image on the display module 45 of the electronic device 100.

The user rotates or moves the electronic device 100 so that the planned capturing area X approaches the recommended frame Z.

In addition, in the super wide camera image, the shape and size of planned capturing area X and the shape and size of the recommended frame Z are the same.

Then, the subject 101 is photographed by the wide camera module 50 of the camera module 102 in response to a user operation on the shutter button 46a of the input module 46.

Next, a control operation relating to shooting of the electronic device 100 having the above-described configuration will be described.

Figure 4:
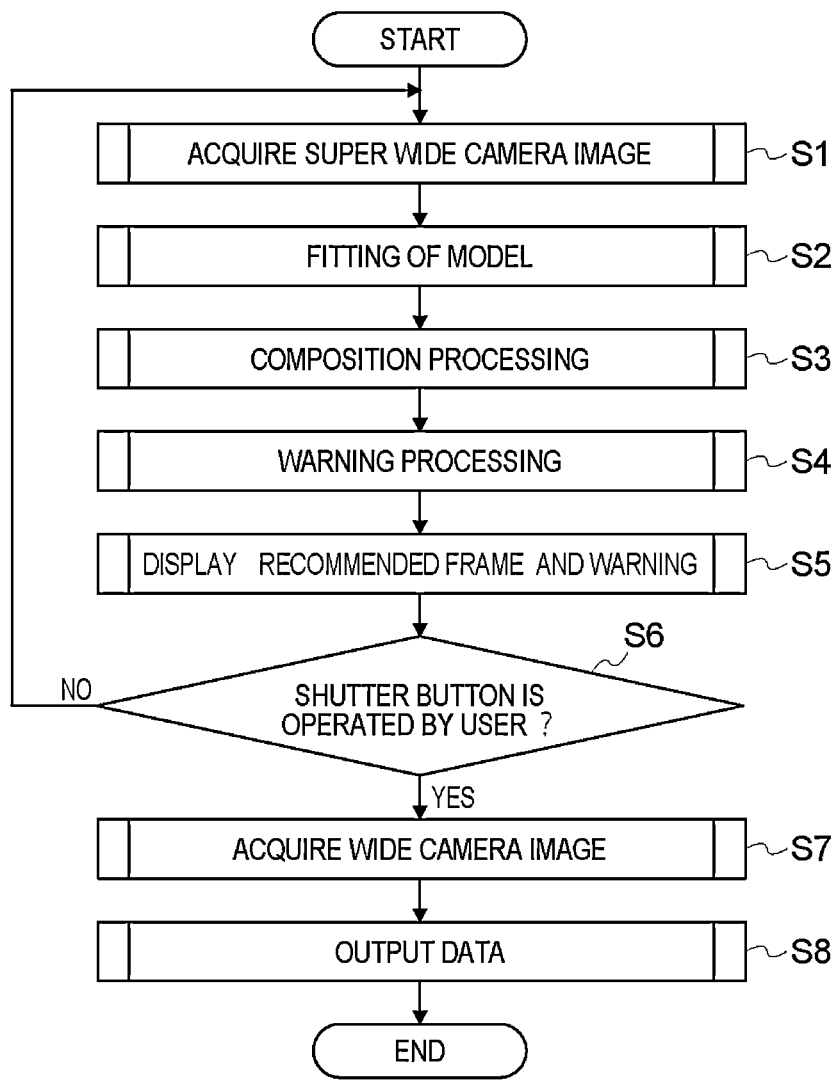
FIG. 4 is a diagram showing an example of a flow of control operation of the electric device shown in FIG. 2 when a subject is photographed.
Figure 5:
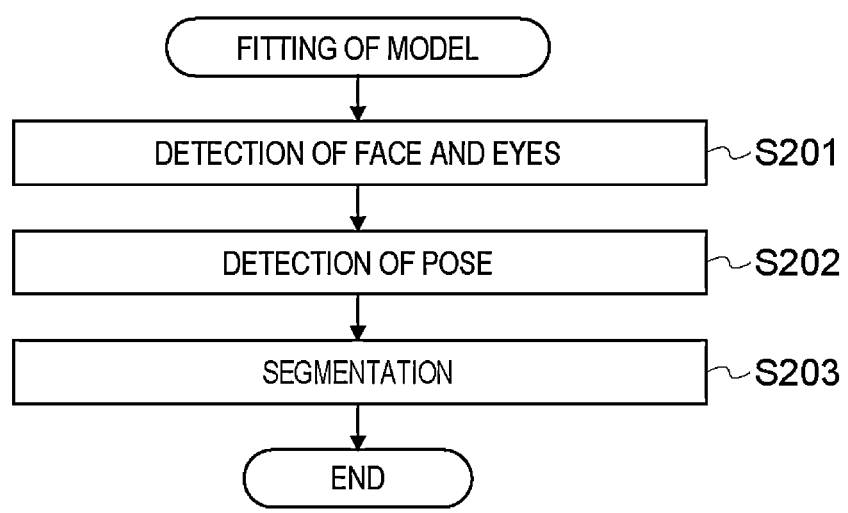
FIG. 5 is a diagram showing a specific example of the model fitting step S2 in the flow shown in FIG. 4.

FIG. 4 is a diagram showing an example of a flow of control operation of the electric device shown in FIG. 2 when a subject is photographed.

First, as shown in FIG. 4, the image signal processor 30 of the electric device 100 controls the super wide camera module to acquire the super wide camera image of the subject (the step S1 of FIG. 4).

Next, the image signal processor 30 executes fitting of the model of the photographed subject (the step S2 of FIG. 4).

Next, the image signal processor 30 executes a composition processing (the step S3 of FIG. 4).

That is, the image signal processor 30 sets a planned capturing area X in the super wide camera image corresponding to the area of the wide camera image planned to be captured by the wide camera module.

Then, the image signal processor 30 sets the recommended frame Z of the recommended composition for shooting with the wide camera module 10 based on the image of the subject in the super wide camera image and the planned capturing area X.

Next, the image signal processor 30 executes a warning process to warn that an inappropriate background is reflected (the step S4 of FIG. 4).

Next, the image signal processor 30 displays the recommended frame Z and displays a warning (the step S5 of FIG. 4).

That is, the display module 45 displays the planned capturing area X, the recommended frame Z, and a warning for an inappropriate background.

The display module 45 displays a warning based on the image of the subject in the super wide camera image and the background image of the subject, when an inappropriate image is included around the subject.

Next, the image signal processor 30 determines whether the user has operated the shutter button 46a of the input module 46 (the step S6 of FIG. 4).

The user pans and tilts the electronic device 100 (camera module 102) during the steps S1 to S6 of FIG. 4. The electronic device 100 (camera module 102) may be rotated by a pan/tilt device (not shown).

In this case, the image signal processor 30 determines the final composition of the planned shooting area X in which the wide camera module 10 shoots the subject, in response to a user's operation input that causes the planned capturing area X to approach the recommended frame Z.

Note that, as described above, a person may perform the shutter operation. In the electronic device 100, the shutter may be automatically operated when the set conditions are met.

Next, the image signal processor 30 controls the wide camera module 10 to capture the wide camera image by capturing the subject with the final composition of the planned capturing area X, according to the operation input of the user (the step S7 of FIG. 4).

Next, the image signal processor 30 outputs data to the display module 45 (step S8). Then, the display module 45 displays the wide camera image acquired by photographing the subject with the composition of the final planned capturing area X.

Here, a specific example of step S2 of model fitting, in the flow of the control operation of the electronic device 100 at the time of photographing shown in FIG. 4, will be described.

First, the image signal processor 30 executes the detection of the face and eyes of the person who is the subject in the super wide camera image (step S201).

When the eyes cannot be detected from the face image, the upper and lower half positions of the face image area are set as the eye positions. Also, depending on the algorithm, the face frame may not be the size that covers the face. In that case, the size is corrected to include the face.

Next, the image signal processor 30 detects the pose of the person who is the subject of the super wide camera image (step S202).

If the pose cannot be detected, an area having a height of about 5 to 10 times the area of the face image is set as the human area of the subject.

Next, the image signal processor 30 executes segmentation in the super wide camera image (step S203).

If segmentation is not possible, then by estimating the human region of the subject by widening the outline of the subject from the result of pose detection.

The human area of the subject has attributes of face, eyes, pose, and segmentation area.

In addition, in the super wide camera image, if there is an object of a size equivalent to a person or an object smaller than the person, the object is also considered as a subject.

In addition, in the super wide camera image, when the object other than the person spreads over a wide area, it is not considered.

Figure 6B:
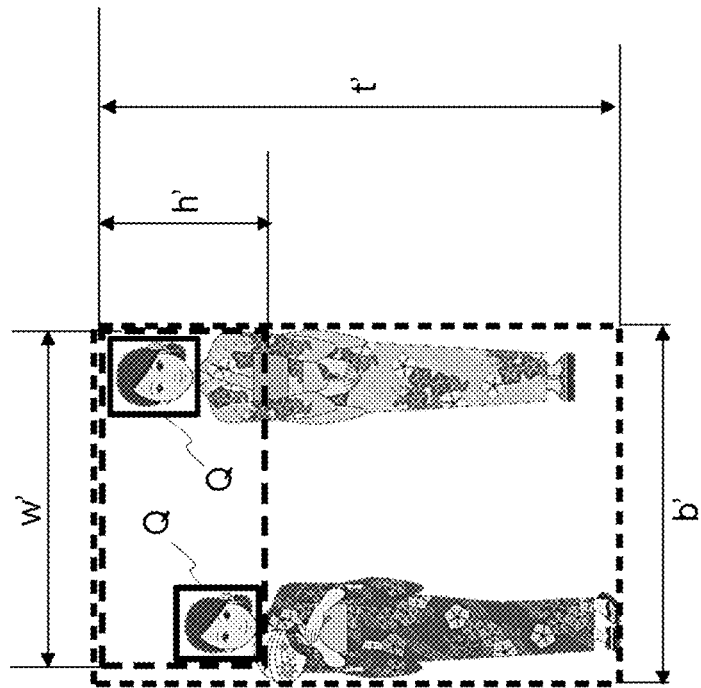
FIG. 6B is a diagram showing an example of the definition of the regions of the images of a plurality of persons when there are a plurality of persons as subjects.
Figure 6A:
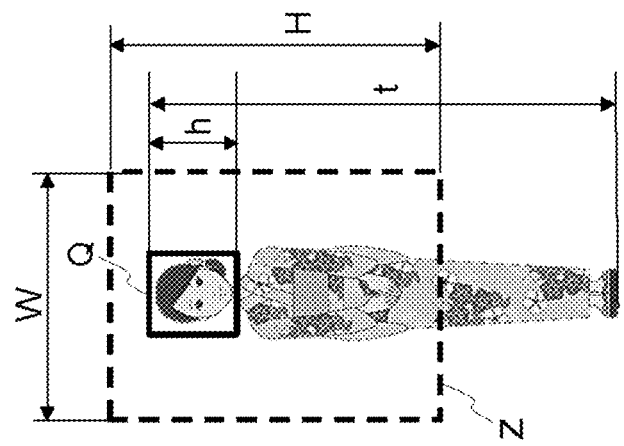
FIG. 6A is a diagram showing an example of a relationship between an image area of a person who is a subject and a recommended frame captured by the wide camera module.

Here, FIG. 6A is a diagram showing an example of a relationship between an image area of a person who is a subject and a recommended frame captured by the wide camera module. FIG. 6B is a diagram showing an example of the definition of the regions of the images of a plurality of persons when there are a plurality of persons as subjects.

In the following description, the relationship between the image area of the person who is the subject and the recommended frame captured by the wide camera module is defined as H: Recommended frame height=wide camera vertical shooting range, W: Recommended frame width=wide Left and right shooting range of camera, h: height of the subject's face (face area Q), and t: Height of the entire body of the subject, as shown in FIG. 6A.

Further, in the case where there are a plurality of persons who are subjects, the regions of the images of the plurality of persons are defined as h': Height that covers all faces (face area QP), w': Width that covers all faces, t': Height that covers the body of all subjects, and b': Width that covers all the body, as shown in FIG. 6B, for example.

Here, a specific example of the step S3 of the composition process of the flow shown in FIG. 4 will be described.

Figure 7:
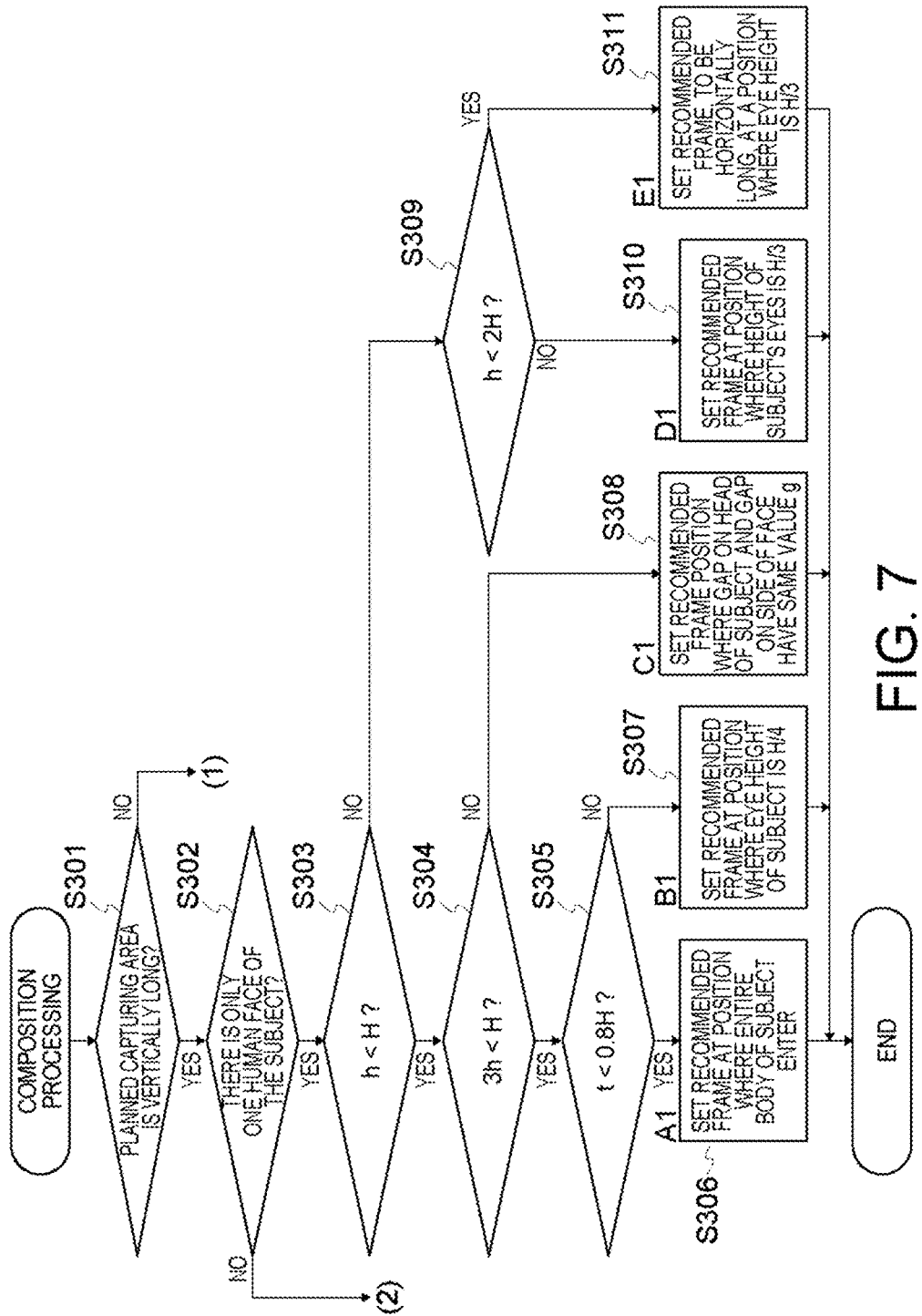
FIG. 7 is a diagram showing a specific example of step S3 of the composition processing of the flow shown in FIG. 4.
Figure 8A:
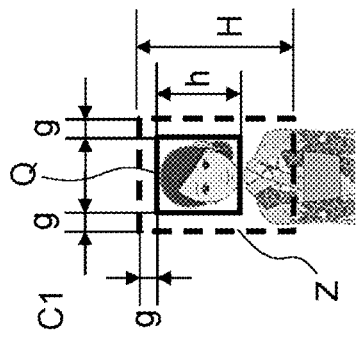
FIG. 8A is a diagram showing an example A1 of the recommended frame set in step S306 shown in FIG. 7.
Figure 8B:
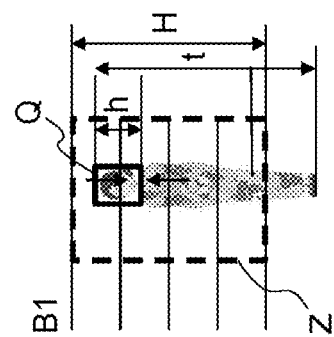
FIG. 8B is a diagram showing an example B1 of the recommended frame set in step S307 shown in FIG. 7.
Figure 8C:
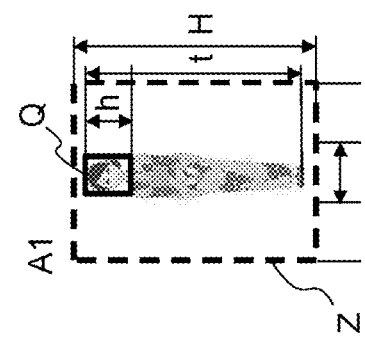
FIG. 8C is a diagram showing an example C1 of the recommended frame set in step S308 shown in FIG. 7.
Figure 8D:
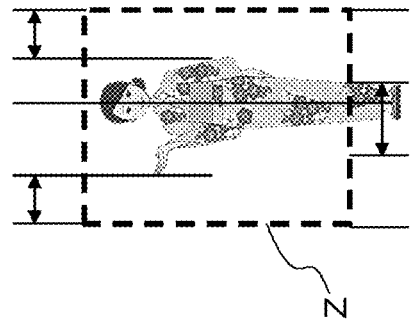
FIG. 8D is a diagram showing an example D1 of the recommended frame set in step S310 shown in FIG. 7.
Figure 8E:
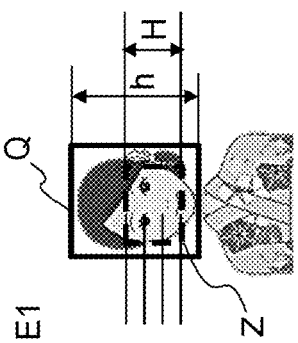
FIG. 8E is a diagram showing an example E1 of the recommended frame set in step S311 shown in FIG. 7.
Figure 8F:
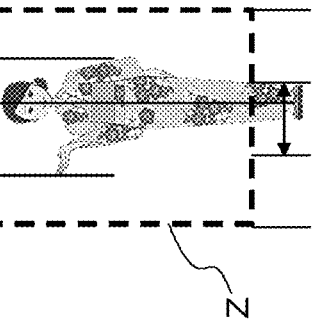
FIG. 8F is a diagram showing an example of the relationship between the face image of the subject and the recommended frame.

FIG. 7 is a diagram showing a specific example of step S3 of the composition processing of the flow shown in FIG. 4. FIG. 8A is a diagram showing an example A1 of the recommended frame set in step S306 shown in FIG. 7. FIG. 8B is a diagram showing an example B1 of the recommended frame set in step S307 shown in FIG. 7. FIG. 8C is a diagram showing an example C1 of the recommended frame set in step S308 shown in FIG. 7. FIG. 8D is a diagram showing an example D1 of the recommended frame set in step S310 shown in FIG. 7. FIG. 8E is a diagram showing an example E1 of the recommended frame set in step S311 shown in FIG. 7. FIG. 8F is a diagram showing an example of the relationship between the face image of the subject and the recommended frame.

First, as shown in FIG. 7, the image signal processor 30 determines whether the planned capturing area is vertically long or not in the composition process of the step S3 of FIG. 4 (the step S301 of FIG. 7).

Then, when the image signal processor 30 determines in step S301 that the planned capturing area is vertically long, the image signal processor 30 determines whether there is only one human face of the subject or not (the step S302 of FIG. 7).

Then, when the image signal processor 30 determines in step S302 that the subject's face is one, the image signal processor 30 determines whether the height "h" of the subject's face<the shooting vertical range "H" of the wide camera or not (the step S303 of FIG. 7).

Then, when the image signal processor 30 determines that "h"<"H" in the step S303, the image signal processor 30 determines whether 3"h"<"H" or not (the step S304 of FIG. 7).

Then, when the image signal processor 30 determines in step S304 that 3h<H, the image signal processor 30 determines whether the height "t" of the entire body of the subject<0.8"H" or not (the step S305 of FIG. 7).

Then, when the image signal processor 30 determines in the step S305 that "t"<0.8"H", the image signal processor 30 sets the recommended frame Z at a position where the entire body of the subject enters (the step S306 of FIG. 7), as shown in FIG. 8A.

On the other hand, when the image signal processor 30 determines in step S305 that "t"<0.8"H" is not satisfied, the image signal processor 30 sets the recommended frame Z at a position where the eye height of the subject is "H"/4, as shown in FIG. 8B (the step S307 of FIG. 7).

Further, when the image signal processor 30 determines in step S304 described above that 3 "h"<"H" is not satisfied, the image signal processor 30 sets the recommended frame Z at a position where the gap on the head of the subject and the gap on the side of the face have the same value g as shown in FIG. 8C (the step S308 of FIG. 7).

Also, when the image signal processor 30 determines that "h"<"H" in the step S303 described above, the image signal processor 30 determines whether "h"<2"H" or not (the step S309 of FIG. 7).

Then, when the image signal processor 30 determines in the step S309 that "h"<2"H", the image signal processor 30 sets the recommended frame Z at a position where the height of the subject's eyes is "H"/3 as shown in FIG. 8D (the step S310 of FIG. 7).

On the other hand, when the image signal processor 30 determines in the step S309 that the height of the subject's face is not "h"<2 "H", the image signal processor 30 sets the recommended frame to be horizontally long and sets the recommended frame at a position where the eye height is "H"/3 as shown in FIG. 8E (the step S311 of FIG. 7).

In this way, the image signal processor 30 sets the recommended frame Z of the recommended composition for shooting with the wide camera module 10, based on the position and size of the face image of the person of the subject in the super wide camera image.

Further, the image signal processor 30 sets the recommended frame Z of a recommended composition for shooting with the wide camera module 10, based on the eye position of the face image of the subject in the super wide camera image.

For settings A1 and B1, adjust the left and right sides of the recommended frame Z within a range up to ⅓ of the width of the recommended frame Z at a position where the entire body of the subject can enter.

Regarding the vertical position of setting B1, finely adjust the vertical position so that it does not cut at the knees of the subject.

The hysteresis may be set or the filtering may be performed to prevent frequent transitions due to subtle changes in values between settings A1 and B1 and between settings B1 and C1.

As shown in FIG. 8F, the right and left sides of the recommended frame Z may be equally spaced within a range in which the center of the face of the subject does not extend beyond the predetermined range of the recommended frame Z.

Next, details of the flow in the case where the planned capturing area is not vertically long (that is, horizontally long) will be described.

Figure 9:
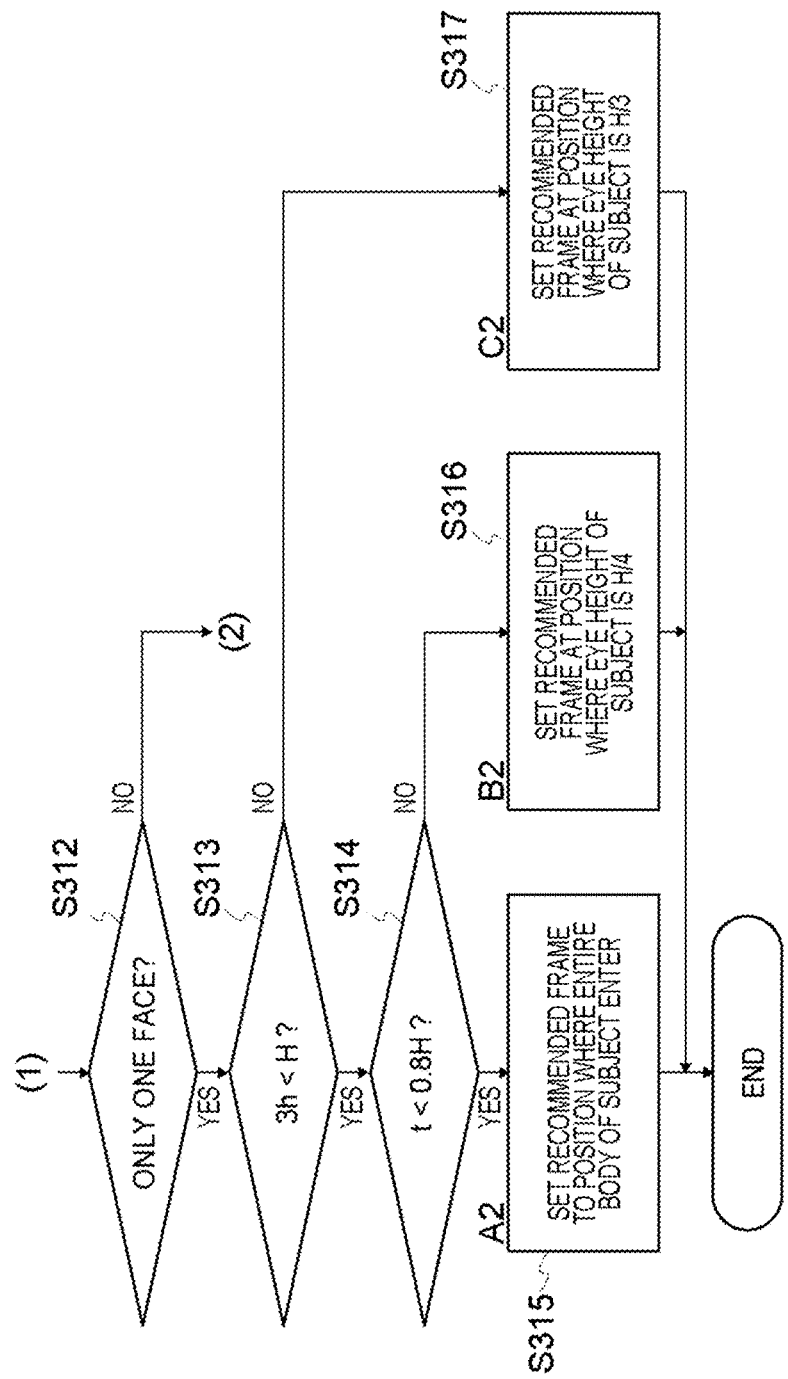
FIG. 9 is a diagram showing a specific example of a flow following in the case (1) where it is determined in step S301 shown in FIG. 7 that the planned capturing area is not vertically long (that is, horizontally long)
Figure 10C:
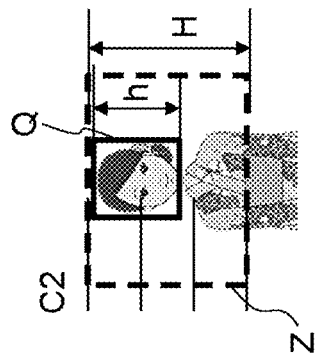
FIG. 10C is a diagram showing an example C2 of the recommended frame set in step S317 shown in FIG. 9.
Figure 10B:
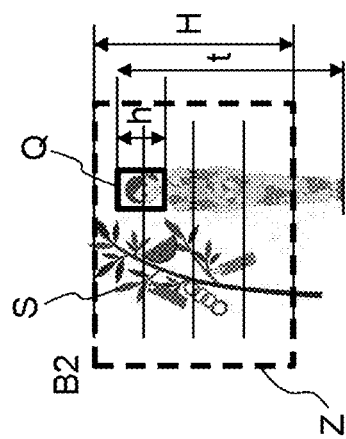
FIG. 10B is a diagram showing an example B2 of the recommended frame set in step S316 shown in FIG. 9.
Figure 10A:
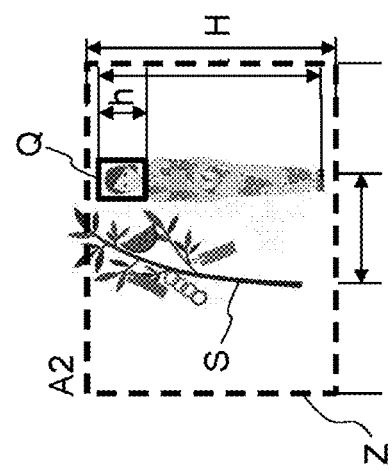
FIG. 10A is a diagram showing an example A2 of the recommended frame set in step S315 shown in FIG. 9.

FIG. 9 is a diagram showing a specific example of a flow following in the case (1) where it is determined in step S301 shown in FIG. 7 that the planned capturing area is not vertically long (that is, horizontally long). FIG. 10A is a diagram showing an example A2 of the recommended frame set in step S315 shown in FIG. 9. FIG. 10B is a diagram showing an example B2 of the recommended frame set in step S316 shown in FIG. 9. FIG. 10C is a diagram showing an example C2 of the recommended frame set in step S317 shown in FIG. 9.

As shown in FIG. 9, when the image signal processor 30 determines in the step S301 shown in FIG. 7 that the planned capturing area is not vertically long (that is, horizontally long) (1), the image signal processor 30 determines whether the subject has only one face or not (the step S312 of FIG. 9).

Then, when the image signal processor 30 determines in the step S312 that the number of faces of the human subject is one, the image signal processor 30 determines whether 3"h"<"H" or not (the step S313 of FIG. 9).

Then, when the image signal processor 30 determines in step S313 that 3"h"<"H", the image signal processor 30 determines whether "t"<0.8"H" or not (the step S314 of FIG. 9).

Then, when the image signal processor 30 determines in the step S314 that "t"<0.8"H", the image signal processor 30 sets the recommended frame Z to a position where the entire body of the subject enters as shown in 10A (the step S315 of FIG. 9).

On the other hand, when the image signal processor 30 determines in the step S314 that "t"<0.8"H" is not satisfied, the image signal processor 30 sets the recommended frame Z at a position where the eye height of the subject is "H"/4 as shown in FIG. 10B (the step S316 of FIG. 9).

Also, when the image signal processor 30 determines in the step S313 described above that 3"h"<"H" is not satisfied, the image signal processor 30 sets the recommended frame Z at a position where the eye height of the subject is "H"/3 as shown in FIG. 10C (the step S317 of FIG. 9).

In the examples of FIGS. 9A and 9B, the left and right sides of the recommended frame Z are adjusted at positions where the entire body of the subject and the object S enter, and the center of the face of the subject is adjusted within ⅓ of the width of the recommended frame Z.

Next, details of the flow when it is determined that the subject has not one face (That is, there are multiple faces of the subject) will be described.

Figure 11:
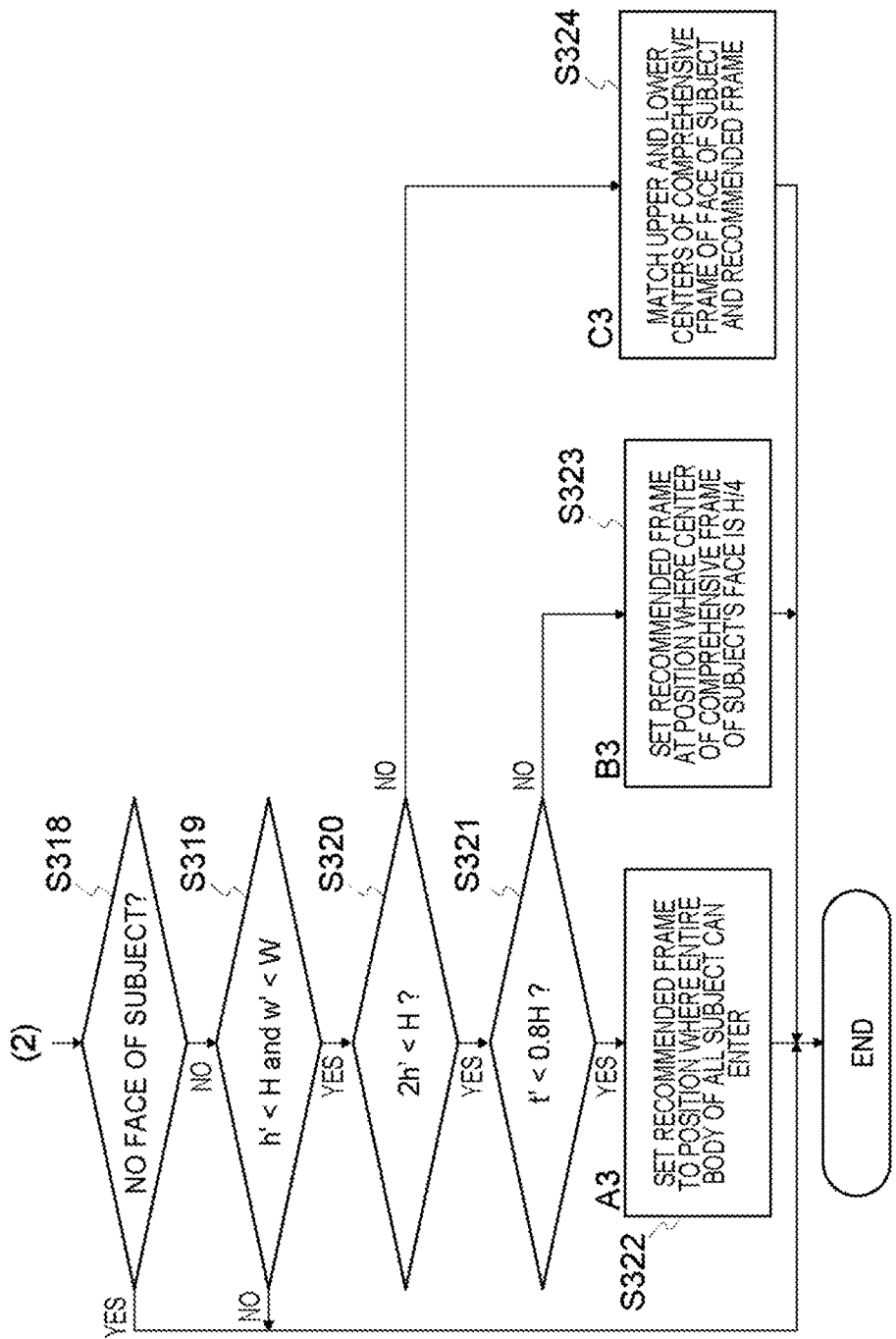
FIG. 11 is a diagram showing a specific example of the flow following in the case (2) where it is determined in step S302 shown in FIG. 7 and step S312 shown in FIG. 9 that the subject's face is not one (That is, there are multiple faces of the subject)
Figure 12A:
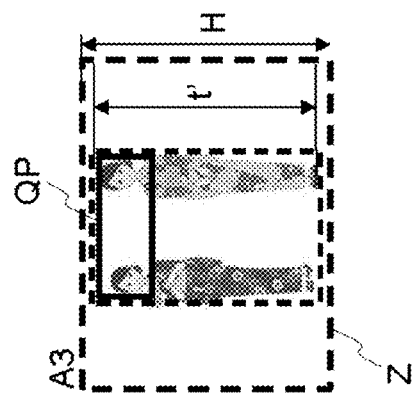
FIG. 12A is a diagram showing an example A3 of the recommended frame set in step S322 shown in FIG. 11.
Figure 12B:
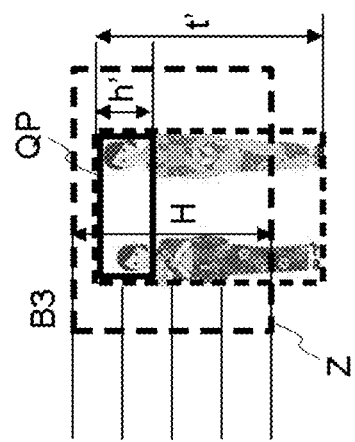
FIG. 12B is a diagram showing an example B3 of the recommended frame set in step S323 shown in FIG. 11.
Figure 12C:
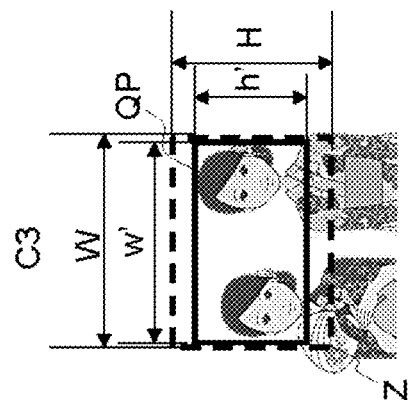
FIG. 12C is a diagram showing an example C3 of the recommended frame set in step S324 shown in FIG. 11.

FIG. 11 is a diagram showing a specific example of the flow following in the case (2) where it is determined in step S302 shown in FIG. 7 and step S312 shown in FIG. 9 that the subject's face is not one (That is, there are multiple faces of the subject). FIG. 12A is a diagram showing an example A3 of the recommended frame set in step S322 shown in FIG. 11. FIG. 12B is a diagram showing an example B3 of the recommended frame set in step S323 shown in FIG. 11. FIG. 12C is a diagram showing an example C3 of the recommended frame set in step S324 shown in FIG. 11.

As shown in FIG. 11, when the image signal processor 30 determines in step S302 shown in FIG. 7 and step S312 shown in FIG. 9 that the subject's face is not one (That is, there are multiple faces of the subject.) (2), the image signal processor 30 determines whether there is no human face of the subject or not (step S318).

When the image signal processor 30 determines in the step S318 that there is no human face of the subject, the image signal processor 30 ends the composition process of step S3.

On the other hand, when the image signal processor 30 determines in the step S318 that there is a face of the subject, the image signal processor 30 determines whether "h'"<"H" and "w'"<"W" or not (the step S319 of FIG. 11).

Then, when the image signal processor 30 determines in the step S319 that "h'"<"H" and "w'"<"W" are not satisfied, the image signal processor 30 ends the composition process in step S3.

On the other hand, when the image signal processor 30 determines in the step S319 that "h'"<"H" and "w'"<"W", the image signal processor 30 determines whether 2"h'"<"H" or not (the step S320 of FIG. 11).

Then, when the image signal processor 30 determines in step S320 that 2"h'"<"H", the image signal processor 30 determines whether "t'"<0.8"H" or not (the step S321 of FIG. 11).

Then, when the image signal processor 30 determines in the step S321 that "t+"<0.8"H", the image signal processor 30 sets the recommended frame Z to a position where the entire body of all the subject can enter as shown in 12A (the step S324 of FIG. 9).

On the other hand, when the image signal processor 30 determines in the step S321 that "t'"<0.8"H" is not satisfied, the image signal processor 30 sets the recommended frame Z at a position where the center of the comprehensive frame QP of the subject's face is "H"/4 as shown in FIG. 12B (step S323).

Further, when the image signal processor 30 determines in the step S320 that 2"h'"<"H" is not satisfied, the image signal processor 30 matches the upper and lower centers of the comprehensive frame QP of the face of the subject and the recommended frame Z as shown in FIG. 12C (the step S324 of FIG. 11).

In this way, the image signal processor 30 sets the recommended frame Z so as to include the face images of the plurality of persons in the super wide camera image when the subjects are a plurality of persons.

In the settings A3, B3, C3 shown in FIGS. 12A to 12C, the left and right centers of the comprehensive line QP of the face are aligned with the left and right centers of the recommended frame.

Through the above steps S301 to S324, the composition process (the step S3 of FIG. 4) for setting the recommended frame is completed.

Next, a specific example of the warning process in step S4 of the flow shown in FIG. 4 will be described.

Figure 13:
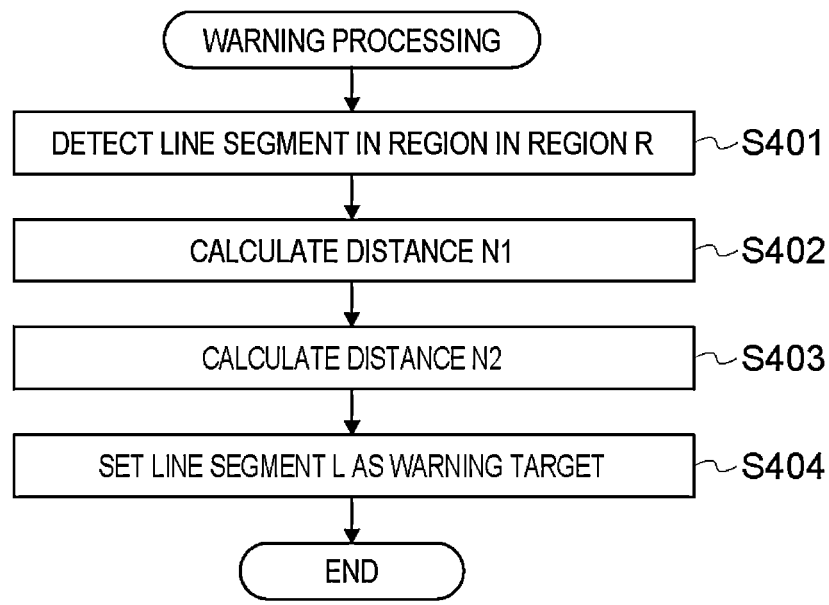
FIG. 13 is a diagram showing a specific example of step S4 of the warning process of the flow shown in FIG. 13.
Figure 14A:
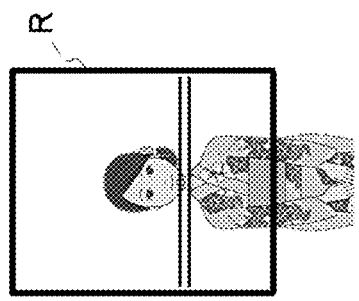
FIG. 14A is a diagram showing an example in which an inappropriate background (a horizontal bar) is located near the face image of the subject.
Figure 14B:
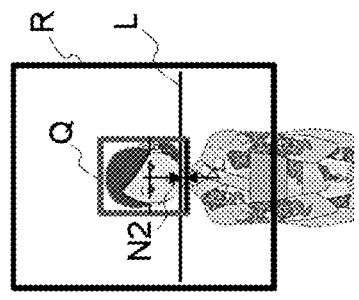
FIG. 14B is a diagram showing an example of the image of the processing in step S401 shown in FIG. 13 for the image shown in FIG. 14A.
Figure 14C:
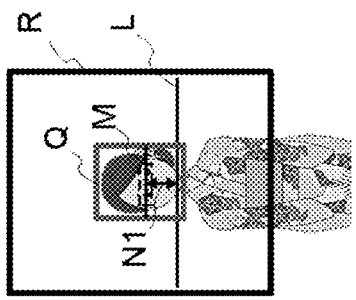
FIG. 14C is a diagram showing an example of an image of the process in step S402 shown in FIG. 13, subsequent to FIG. 14B.
Figure 14D:
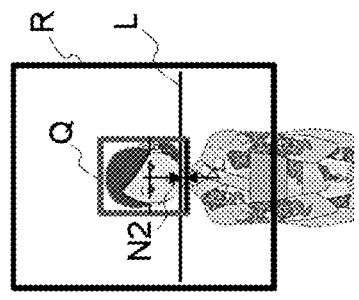
FIG. 14D is a diagram illustrating an example of an image of the process in step S403 shown in FIG. 13, subsequent to FIG. 14C.

FIG. 13 is a diagram showing a specific example of step S4 of the warning process of the flow shown in FIG. 13. FIG. 14A is a diagram showing an example in which an inappropriate background (a horizontal bar) is located near the face image of the subject. FIG. 14B is a diagram showing an example of the image of the processing in step S401 shown in FIG. 13 for the image shown in FIG. 14A. FIG. 14C is a diagram showing an example of an image of the process in step S402 shown in FIG. 13, subsequent to FIG. 14B. FIG. 14D is a diagram illustrating an example of an image of the process in step S403 shown in FIG. 13, subsequent to FIG. 14C.

First, as shown in FIG. 13, in the warning process, the image signal processor 30 detects a line segment in a region other than the body in a region R having a width and height three times the frame Q of the subject's face of the image shown in FIG. 14A (the step S401 of FIG. 13, FIG. 14B).

Next, the image signal processor 30 calculates the distance N1 between the center of the frame M covering the subject's eyes and the detected line segment L (the step S402 of FIG. 13, FIG. 14C).

Next, the image signal processor 30 calculates the distance N2 between the center of the lower edge of the frame Q of the subject's face and the line segment L (the step S403 of FIG. 13, FIG. 14D).

Next, if there is a line segment smaller than a predetermined distance of the subject with respect to the calculated distances N1 and N2, the image signal processor 30 sets the line segment L as a warning target (the step S404 of FIG. 13).

Through the above steps S301 to S324, the warning process (the step S4 of FIG. 4) is completed.

Next, a specific example of the step S5 of the recommended composition frame/warning display in the flow shown in FIG. 4 will be described.

Figure 15A:
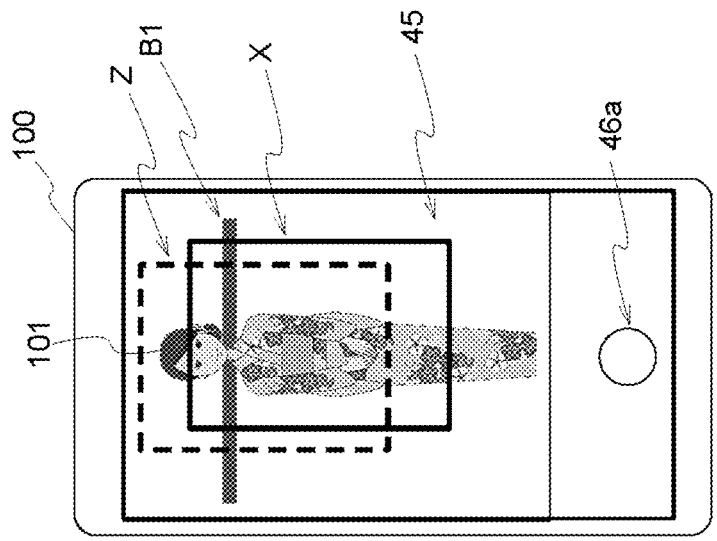
FIG. 15A is a diagram showing an example of the display of the display module 45 of the electronic device 100 when the warning in step S404 shown in FIG. 13 is turned on for the image shown in FIG. 14A.
Figure 15B:
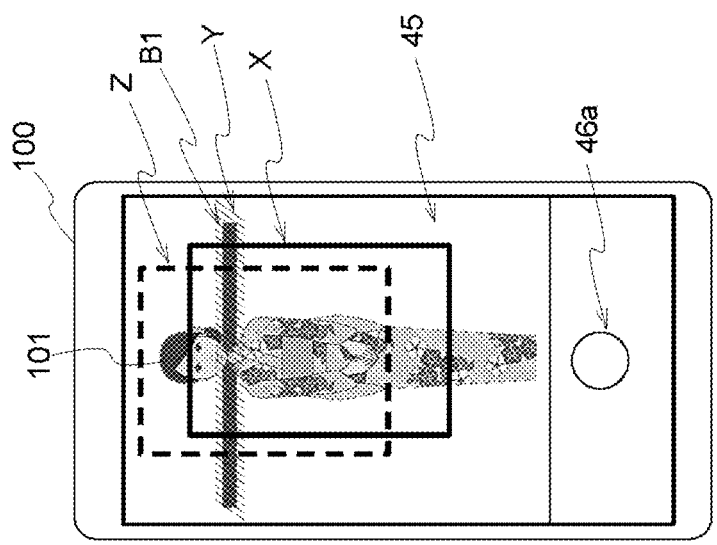
FIG. 15B is a diagram showing an example of the display of the display module 45 of the electronic device 100 when the warning in step S404 shown in FIG. 13 is turned off for the image shown in FIG. 14A.

FIG. 15A is a diagram showing an example of the display of the display module 45 of the electronic device 100 when the warning in step S404 shown in FIG. 13 is turned on for the image shown in FIG. 14A. FIG. 15B is a diagram showing an example of the display of the display module 45 of the electronic device 100 when the warning in step S404 shown in FIG. 13 is turned off for the image shown in FIG. 14A.

As shown in FIG. 15A, in the recommended frame/warning display in step S5, the set recommended frame Z and the warning area Y determined by the warning process are displayed on the display module 45.

In the display module 45, the warning area Y is emphasized by changing the color or blinking.

In this way, the image signal processor 30 displays the warning on the display module when a predetermined improper image is included around the face image of the subject, based on the face image of the subject and the background image of the subject in the super wide camera image.

Next, another specific example of the warning process of the flow of the step S4 shown in FIG. 4 will be described.

FIG. 16A is a diagram showing an example in which an inappropriate background (a vertical bar) is located near the face image of the subject. FIG. 16B is a diagram showing an example of an image of the processing in step S401 shown in FIG. 13 for the image shown in FIG. 16A. FIG. 16C is a diagram showing an example of an image of the process in step S402 shown in FIG. 13, subsequent to FIG. 16B. FIG. 16D is a diagram illustrating an example of an image of the process in step S403 shown in FIG. 13, subsequent to FIG. 16C.

First, as shown in FIG. 13, in the warning process, the image signal processor 30 detects a line segment in a region other than the body in a region R having a width and height three times the frame Q of the subject's face of the image shown in FIG. 16A (the step S401 of FIG. 13, FIG. 16B).

Next, the image signal processor 30 calculates a distance N3 between the left and right centers of the frame M covering the subject's eyes and the detected line segment L (the step S402 of FIG. 13, FIG. 16C).

Next, the image signal processor 30 calculates the distance N4 between the center of the lower end of the frame Q of the subject's face and the line segment L (the step S403 of FIG. 13, FIG. 16D).

Next, if there is a line segment smaller than a predetermined distance of the subject with respect to the calculated distances N3 and N4, the image signal processor 30 sets the line segment as a warning target (step S404).

Next, another specific example of the recommended composition frame/warning display in step S5 of the flow shown in FIG. 4 will be described.

FIG. 17A is a diagram showing an example of the display of the display module 45 of the electronic device 100 when the warning in step S404 shown in FIG. 13 is turned on for the image shown in FIG. 16A. FIG. 17B is a diagram showing an example of the display of the display module 45 of the electronic device 100 when the warning in step S404 shown in FIG. 13 is turned off for the image shown in FIG. 16A.

As shown in FIG. 17A, in the recommended frame/warning display in step S5, the set recommended frame Z and the warning area Y determined by the warning process are displayed on the display module 45.

In the display module 45, the warning area Y is emphasized by changing the color or blinking.

As described above, the electric device of the present invention can easily obtain a camera image with an appropriate composition and without improper background when photographing with a camera of an electronic device such as a smartphone.

In the description of embodiments of the present disclosure, it is to be understood that terms such as "central", "longitudinal", "transverse", "length", "width", "thickness", "upper", "lower", "front", "rear", "back", "left", "right", "vertical", "horizontal", "top", "bottom", "inner", "outer", "clockwise" and "counterclockwise" should be construed to refer to the orientation or the position as described or as shown in the drawings in discussion. These relative terms are only used to simplify the description of the present disclosure, and do not indicate or imply that the device or element referred to must have a particular orientation, or must be constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, a feature defined as "first" and "second" may comprise one or more of this feature. In the description of the present disclosure, "a plurality of" means "two or more than two", unless otherwise specified.

In the description of embodiments of the present disclosure, unless specified or limited otherwise, the terms "mounted", "connected", "coupled" and the like are used broadly, and may be, for example, fixed connections, detachable connections, or integral connections; may also be mechanical or electrical connections; may also be direct connections or indirect connections via intervening structures; may also be inner communications of two elements which can be understood by those skilled in the art according to specific situations.

In the embodiments of the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are in contact via an additional feature formed therebetween. Furthermore, a first feature "on", "above" or "on top of" a second feature may include an embodiment in which the first feature is orthogonally or obliquely "on", "above" or "on top of" the second feature, or just means that the first feature is at a height higher than that of the second feature; while a first feature "below", "under" or "on bottom of" a second feature may include an embodiment in which the first feature is orthogonally or obliquely "below", "under" or "on bottom of" the second feature, or just means that the first feature is at a height lower than that of the second feature.

Various embodiments and examples are provided in the above description to implement different structures of the present disclosure. In order to simplify the present disclosure, certain elements and settings are described in the above. However, these elements and settings are only by way of example and are not intended to limit the present disclosure. In addition, reference numbers and/or reference letters may be repeated in different examples in the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may also be applied.

Reference throughout this specification to "an embodiment", "some embodiments", "an exemplary embodiment", "an example", "a specific example" or "some examples" means that a particular feature, structure, material, or characteristics described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which it should be understood by those skilled in the art that functions may be implemented in a sequence other than the sequences shown or discussed, including in a substantially identical sequence or in an opposite sequence.

The logic and/or step described in other manners herein or shown in the flow chart, for example, a particular sequence table of executable instructions for realizing the logical function, may be specifically achieved in any computer readable medium to be used by the instructions execution system, device or equipment (such as a system based on computers, a system comprising processors or other systems capable of obtaining instructions from the instructions execution system, device and equipment executing the instructions), or to be used in combination with the instructions execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instructions execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although embodiments of the present disclosure have been shown and described, it would be appreciated by those skilled in the art that the embodiments are explanatory and cannot be construed to limit the present disclosure, and changes, modifications, alternatives and variations can be made in the embodiments without departing from the scope of the present disclosure.

What is claimed:

1. An electric device comprising:
a camera module that takes a photograph of a subject to acquire a first camera image, and takes a photograph of the subject to acquire a second camera image with a wider angle of view than the first camera image;
an image signal processor that controls the camera module to acquire a camera image; and
a display module that displays an image,
wherein the image signal processor acquires the second camera image of the subject by controlling the camera module,
then, the image signal processor sets a planned capturing area in the second camera image corresponding to the area of the first camera image planned to be captured by the camera module,
then, the image signal processor sets a recommended frame of a recommended composition based on an image of the subject and the planned capturing area in the second camera image,
then, the display module displays the planned capturing area and the recommended frame in the second camera image, and
then, the image signal processor acquires the first camera image by capturing the subject with a final composition of the planned capturing area by controlling the camera module,
wherein the first camera image is a wide camera image, and the second camera image is a super wide camera image; and
wherein the display module displays a warning when an unsuitable image is included around the subject in the super wide camera image, based on the image of the subject and the background image of the subject in the super wide camera image, after the display module displays the planned capturing area and the recommended frame in the super wide camera image.

2. The electric device according to claim 1, wherein the camera module includes:
a wide camera module that captures the wide camera image by imaging the subject, and a super wide camera module that captures the super wide camera image by imaging the subject at a wider angle of view than the wide camera module.

3. The electric device according to claim 2,
wherein the image signal processor acquires the super wide camera image of the subject by controlling the super wide camera module,
the image signal processor sets the planned capturing area in the super wide camera image corresponding to the area of the wide camera image planned to be captured by the wide camera module,
the image signal processor sets the recommended frame of a recommended composition for capturing with the wide camera module, based on the image of the subject and the planned capturing area in the super wide camera image,
the display module displays the planned capturing area and the recommended frame,
the display module displays a warning when the unsuitable image is included around the subject in the super wide camera image, based on the image of the subject and the background image of the subject in the super wide camera image, and
the image signal processor acquires the wide camera image by capturing the subject with the final composition of the planned capturing area by controlling the wide camera module.

4. The electric device according to claim 3, wherein the image signal processor determines a final composition of the planned capturing area where the wide camera module captures the subject, in response to a user's operation input that causes the planned capturing area to approach the recommended frame.

5. The electric device according to claim 3,
wherein the image signal processor controls the wide camera module to capture the wide camera image by capturing an image of the subject with a final composition of the planned capturing area, in response to user's operation input.

6. The electric device according to claim 3,
wherein the image signal processor sets the recommended frame of a recommended composition for capturing with the wide camera module, based on the position and size of the face image of the person of the subject in the planned capturing area.

7. The electric device according to claim 6,
wherein the image signal processor sets the recommended frame of a recommended composition for capturing with the wide camera module, based on an eye position of the face image of the subject in the planned capturing area.

8. The electric device according to claim 7,
wherein, the image signal processor displays the warning on the display module, when the image signal processor determines that a pre-specified inappropriate image is included around the face image of the subject, based on the face image of the subject and the background image of the subject in the super wide camera image.

9. The electric device according to claim 6,
wherein, when the subject is a plurality of people, the image signal processor sets the recommended frame so as to include the face images of the plurality of people in the super wide camera image.

10. The electric device according to claim 1,
wherein, in the super wide camera image, a shape and size of the range of the planned capturing area and a shape and size of the range of the recommended frame are the same.

11. The electric device according to claim 1,
wherein the display module displays the wide camera image acquired by capturing the subject with the composition of the final planned capturing area.

12. The electric device according to claim 4, further comprising:
an input module which receives the operation of the user; and a main processor that controls the display module and the input module.

13. The electric device according to claim 5, further comprising:
an input module which receives the operation of the user; and
a main processor that controls the display module and the input module.

14. A controlling method for controlling an electric device including:
a camera module that takes a photograph of a subject to acquire a first camera image, and takes a photograph of the subject to acquire a second camera image with a wider angle of view than the first camera image; an image signal processor that controls the camera module to acquire a camera image; and a display module that displays an image, the controlling method comprising:
acquiring, by means of the image signal processor, the second camera image of the subject, by controlling the camera module,
setting, by means of the image signal processor, a planned capturing area in the second camera image corresponding to an area of the first camera image planned to be captured by the camera module,
setting, by means of the image signal processor, a recommended frame of a recommended composition based on an image of the subject and the planned capturing area in the second camera image,
displaying, by means of the display module, the planned capturing area and the recommended frame in the second camera image, and
acquiring, by means of the image signal processor, the first camera image by capturing the subject with a final composition of the planned capturing area by controlling the camera module,
wherein the first camera image is a wide camera image, and the second camera image is a super wide camera image, the controlling method for controlling the electric device further comprises:
displaying, by the display module, a warning when an unsuitable image is included around the subject in the super wide camera image, based on the image of the subject and the background image of the subject in the super wide camera image, after the display module displays the planned capturing area and the recommended frame in the super wide camera image.

15. The controlling method for controlling the electric device according to claim 14, wherein the camera module includes:
a wide camera module that captures the wide camera image by imaging the subject, and a super wide camera module that captures the super wide camera image by imaging the subject at a wider angle of view than the wide camera module.

16. A non-transitory computer readable storage medium having a computer program stored thereon, wherein when the computer program is executed by a processor, the computer program implements a controlling method for controlling an electric device comprising: a camera module that takes a photograph of a subject to acquire a first camera image, and takes a photograph of the subject to acquire a second camera image with a wider angle of view than the first camera image; an image signal processor that controls the camera module to acquire a camera image; and a display module that displays an image, and the controlling method comprises:
acquiring, by means of the image signal processor, the second camera image of the subject, by controlling the camera module,
setting, by means of the image signal processor, a planned capturing area in the second camera image corresponding to an area of the first camera image planned to be captured by the camera module,
setting, by means of the image signal processor, a recommended frame of a recommended composition based on an image of the subject and the planned capturing area in the second camera image,
displaying, by means of the display module, the planned capturing area and the recommended frame in the second camera image, and
acquiring, by means of the image signal processor, the first camera image by capturing the subject with a final composition of the planned capturing area by controlling the camera module,
wherein the first camera image is a wide camera image, and the second camera image is a super wide camera image, the controlling method for controlling the electric device further comprises:
displaying, by the display module, a warning when an unsuitable image is included around the subject in the super wide camera image, based on the image of the subject and the background image of the subject in the super wide camera image, after the display module displays the planned capturing area and the recommended frame in the super wide camera image.

* * * * *